(12) United States Patent
Schroeder et al.

(10) Patent No.: US 8,615,631 B2
(45) Date of Patent: Dec. 24, 2013

(54) DELAYED FREEING OF DATA STORAGE BLOCKS

(75) Inventors: Axel Schroeder, Sinsheim (DE); Dirk Thomsen, Heidelberg (DE)

(73) Assignee: SAP AG, Walldorf (DE)

( * ) Notice: Subject to any disclaimer, the term of this patent is extended or adjusted under 35 U.S.C. 154(b) by 294 days.

(21) Appl. No.: 13/072,643

(22) Filed: Mar. 25, 2011

(65) Prior Publication Data

US 2012/0246405 A1    Sep. 27, 2012

(51) Int. Cl.
    *G06F 12/16* (2006.01)
(52) U.S. Cl.
    USPC ............................................. 711/118
(58) Field of Classification Search
    None
    See application file for complete search history.

(56) References Cited

U.S. PATENT DOCUMENTS

| | | | |
|---|---|---|---|
| 2005/0267816 A1* | 12/2005 | Jaramillo | 705/26 |
| 2006/0004860 A1* | 1/2006 | Liedes et al. | 707/104.1 |
| 2008/0288713 A1* | 11/2008 | Lee et al. | 711/103 |

* cited by examiner

*Primary Examiner* — Duc Doan
(74) *Attorney, Agent, or Firm* — Mintz, Levin, Cohn, Ferris, Glovsky and Popeo, P.C.

(57) ABSTRACT

A memory block that includes a physical storage page holding data of a data storage application in a page buffer can be cached in a page buffer upon the memory block being designated for a change in status from a used status to a shadow status. Upon occurrence of a trigger event, all pages stored in the page buffer can be processed in a first batch process that can include converting each of the pages in the page buffer from the used status to the shadow status and emptying the page buffer. Upon receiving a call to free the pages in the page buffer from the shadow status to a free status without the trigger event occurring, the pages in the page buffer can be converted from the used status directly to the free status in a second batch process. Related methods, systems, and articles of manufacture are also disclosed.

17 Claims, 4 Drawing Sheets

DELAYED FREEING OF DATA STORAGE BLOCKS

TECHNICAL FIELD

The subject matter described herein relates to optimizing performance in data storage applications (e.g. a database) and other computing environments in which data are written and/or read from a storage medium or storage device.

BACKGROUND

Storage pages can be used in association with a data storage application that writes and/or reads data from a persistency layer that can include active data stored in fast but relatively expensive memory that is in turn written to a less expensive storage for longer term retention. The persistence layer can ensure that changes made within the data storage application are durable and that the data storage application can be restored to a most recent committed state after a restart. A committed state is achieved by writing the changes made to data in the persistence layer to the longer term storage. Data are stored in the longer term storage are organized in storage pages, a term that refers to a unit of physical storage.

A shadow paging technique can be used in conjunction with data storage applications to avoid overwriting an existing version of a page with changes until the changes are ready to be committed to longer term storage. For example, shadow paging can be used to undo changes that were written to the longer term storage since a most recent savepoint. A shadow page can be allocated to retain the original state of a logical page when the logical page is to be modified. A storage page retained in the longer term storage at a most recent savepoint are not overwritten until a subsequent savepoint is successfully completed. Instead, new physical pages are used to store changed logical pages. Therefore, until the subsequent savepoint is written to longer term storage, two physical pages may exist for one logical page: a shadow page containing the version written during the most recent savepoint, and a current physical page reflecting changes written to longer term storage since the most recent savepoint.

SUMMARY

In one aspect, a method includes caching a memory block that includes a physical storage page holding data of a data storage application in a page buffer. The caching occurs upon the memory block being designated for a change in status from a used status to a shadow status. Upon occurrence of a trigger event, all pages stored in the page buffer are processed in a first batch process that includes converting each of the pages in the page buffer from the used status to the shadow status and emptying the page buffer. Upon receiving a call to free the pages in the page buffer from the shadow status to a free status without the trigger event occurring is received, the pages in the page buffer are converted from the used status directly to the free status in a second batch process.

In some variations one or more of the following features can optionally be included in any feasible combination. The data storage application can include at least one of a database application and a network-attached storage system. The trigger event can include a preset time having elapsed. The page buffer can have a fixed size and the trigger event can include a number of memory blocks cached in the page buffer reaching the fixed size. The page buffer can be retained in a persistence layer of the data storage application, and the memory blocks can be stored on a durable storage device. A free block manager in the persistence layer can track a status of the memory blocks.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims. For example, while the specific examples described below to illustrate features of the current subject matter make reference to the data storage application being a database, other types of data storage applications are within the scope of the current subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
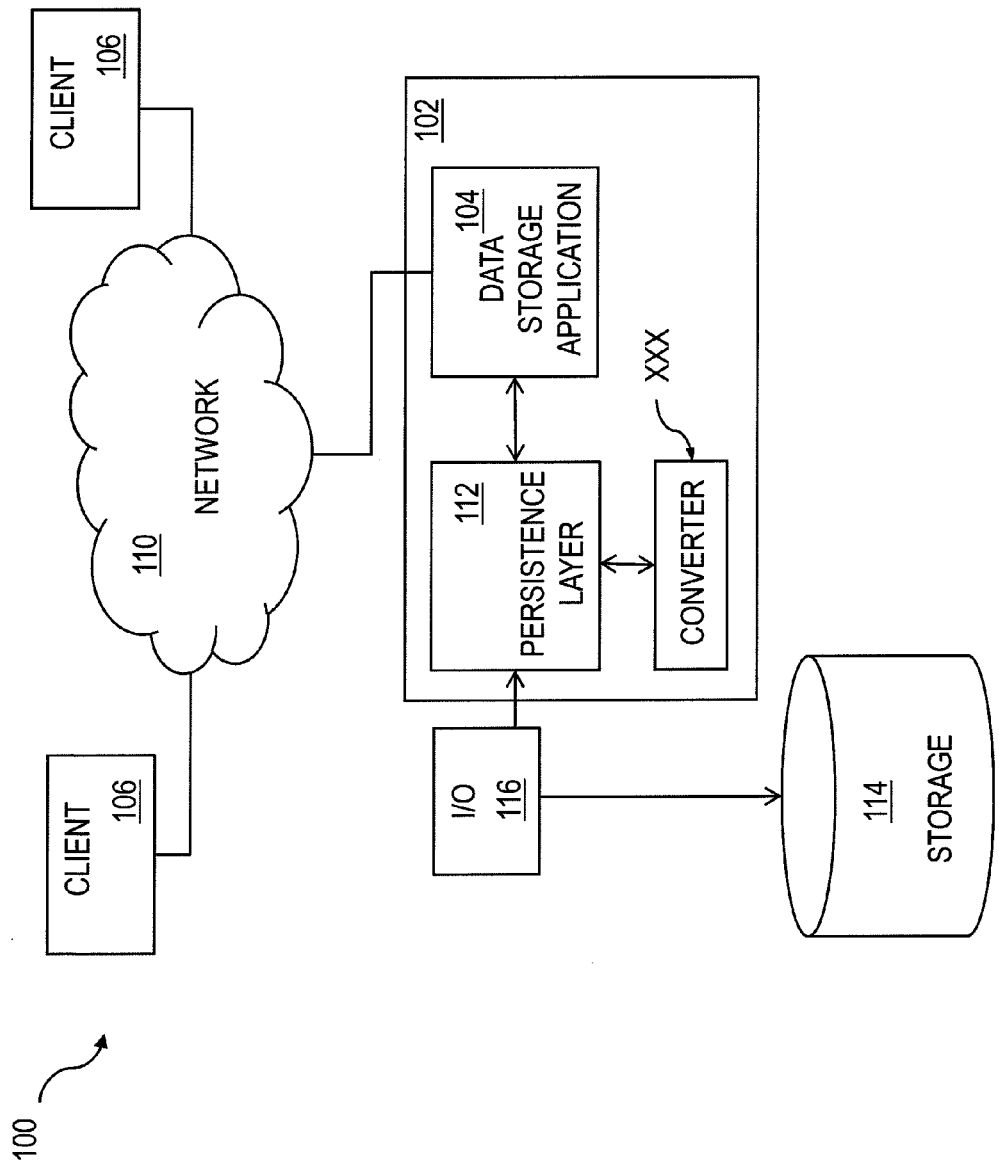
FIG. 1 is a box diagram illustrating aspects of a system at least some of whose features are consistent with implementations of the current subject matter.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. For simplicity, features of the current subject matter are described with reference to such an approach, in which each block of physical storage has a block size, S and an index identifier i. Each block then occupies an interval [i×S, (i+1)×S] on the physical storage medium of the storage 114 and can contain one page of size S. However, other implementations in which the amount of storage space allocated to each page can vary are also within the scope of the current subject matter. A data storage application 104 tracks which blocks of data storage in the storage 114 are "used" (i.e. have a page or part of a page stored therein) and which are currently unused or "free." The tracking can in some implementations include an array of state values or some other transient representation of free and used blocks in the storage 114. In a shadow paging approach, a third status, which is technically a subset of the "used" status, can be "shadow."

A typical block allocation manager or other component tasked with maintaining assignment status information of memory blocks in the storage 114 may perform operations including allocating a block having a free status to "used" when the block is required to contain a logical page or part thereof, releasing a block that has previously been used to a "free" status once it is no longer needed, assigning a block as a shadow block, and releasing a block previously set as a shadow block back to a "free" status. The first three of these operations can be implemented using single block operations and batch operations that process multiple blocks in a single operation. For example, a list of block indices can be processed to set the state of each block in the list to "free."

To accelerate search operations for the block allocation and releasing of shadow block operations, a search tree can be built on top of the state array. Such a tree can have a height on the order of the number of states. While a search tree accelerates search operations, it can also slow down update operations such as the releasing and setting of the shadow block state because an update of an individual block state can induce an update of the search tree.

To address these and potentially other issues with currently available solutions, one or more implementations of the current subject matter provide methods, systems, articles or manufacture, and the like that can, among other possible advantages, reduce or even minimize the system resources required to maintain and manage block status information. Unnecessary status change can desirably be reduced as well.

Changing the state of a single block can in general require on the order of a time H to traverse the search tree from its root to the branch or leaf representing the block whose status is to be changed. As such, changing the status of a set of n blocks one at a time can require on the order of n×H. To accomplish the same result using a single batch operation can require time on the order of the number of blocks, n, because in this instance only n leaf nodes are visited and only on the order of n inner nodes need to be traversed. As such, batch operations are generally preferable to single operations and are advantageously used whenever possible. Additionally, to the extent that status changes can be reduced, further performance improvements can be realized. For example, from a system resource usage standpoint, it is cheaper to change the status of a block only once (e.g. from "used" to "free") than twice (e.g. from "used" to "shadow" and then to "free").

Figure 2:
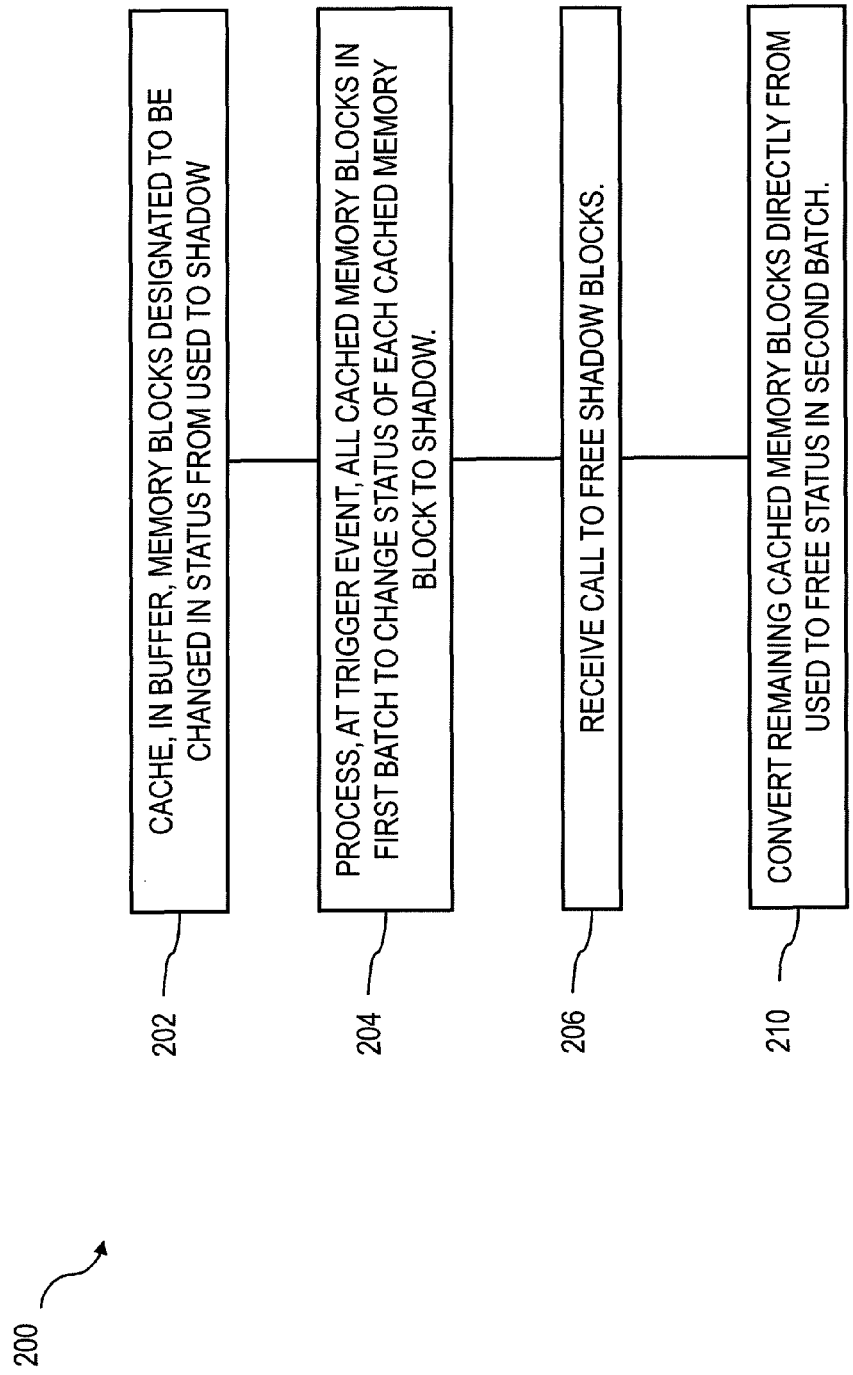
FIG. 2 is a process flow diagram illustrating features of a method consistent with implementations of the current subject matter.

Implementations of the current subject matter can include features providing one or both of these advantages. For example, the process flow chart 200 of FIG. 2 shows a method having at least some features consistent with an implementation of the current subject matter. At 202, memory blocks in a storage 114 that are designated to be changed in status from a used state to a shadow state can be cache in a page buffer. When a trigger event, which can include passage of a fixed amount of time since a last flush of the buffer, a fixed size of the page buffer being reached, or the like, at 204 all of the cached memory blocks in the buffer can be processed in a first batch operation to change the status of each cached block to a shadow status. After a call is received at 206 to free any cached shadow blocks that have accumulated in the cache without the trigger event occurring, at 210 the remaining cached blocks can be processed in a second batch operation to change their status directly from a used status to a free status. In some examples, the call to free all shadow blocks from the cache can be received when a savepoint is executed and all changes are written to disk, thereby eliminating the need to retain shadow pages.

By caching memory blocks whose content is to be changed to shadow from used for processing in batch mode performance for this process can be improved from the order of n×H the order of n for a buffer of size n. Additionally, by converting pages in the buffer directly from the used status to the free status without first being converted to the shadow state, two performance savings can be realized in that a batch process is used, and one conversion per block is avoided.

Figure 3:
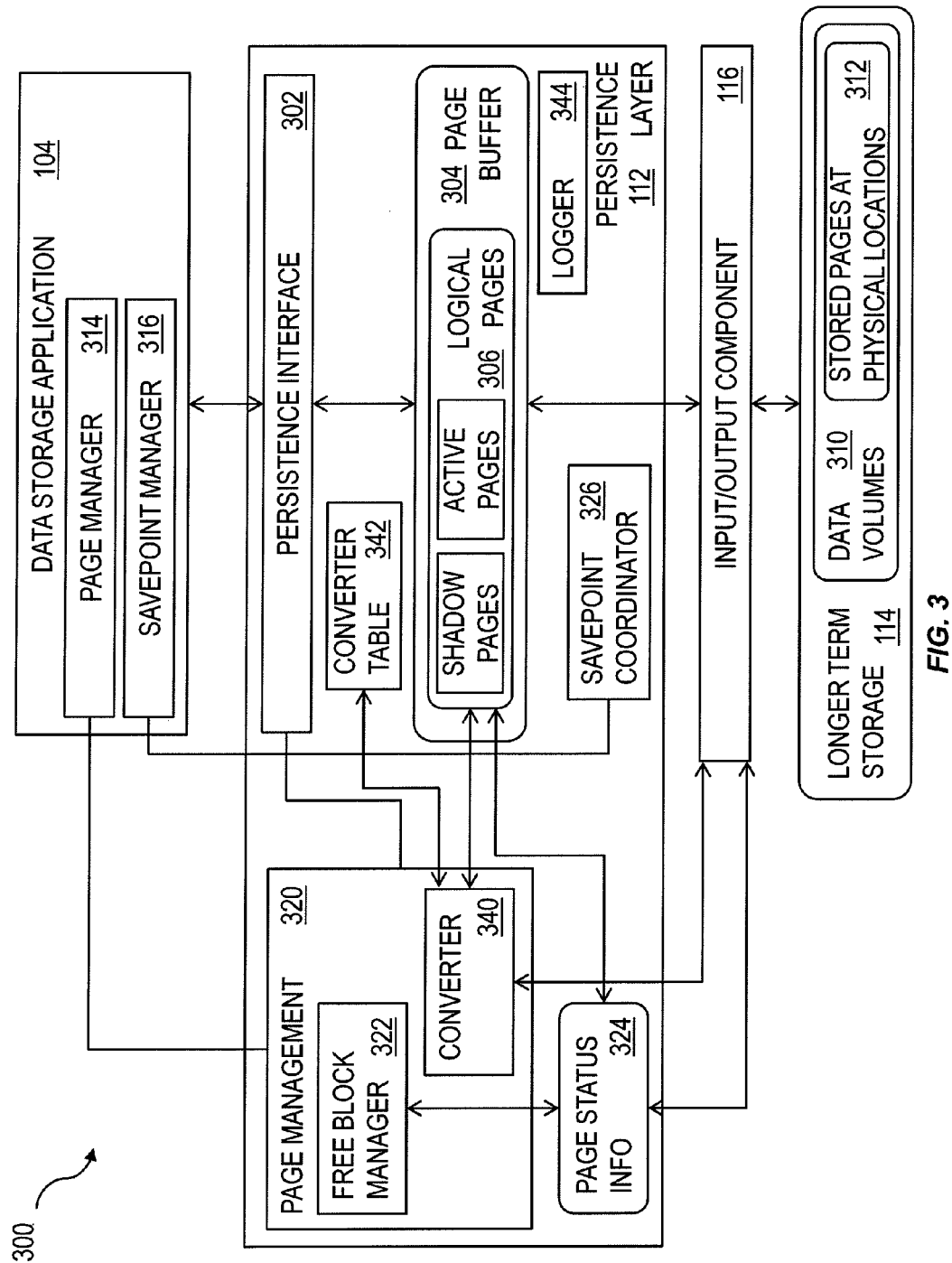
FIG. 3 is a diagram illustrating features of a system architecture at least some of whose features are consistent with implementations of the current subject matter.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, optionally can include shadow pages, active pages, and the like. The logical pages 306 retained in the persistence layer 112 can be written to a storage (e.g. a longer term storage) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash.

In some implementations of a data storage application 104, the page management module of the persistence layer 112 can implement a shadow paging approach as discussed above. The free block manager 322 within the page management module 320 can maintain the status of physical pages and can assign the processes of converting storage page statuses between free, used, and shadow in accordance with implementations described herein. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component can be used during recovery to replay operations since last savepoint to ensure that all operations are applied to the data and that transactions with a logged "COMMIT" record are committed before rolling back still-open transactions at the end of a recovery process.

Figure 4:
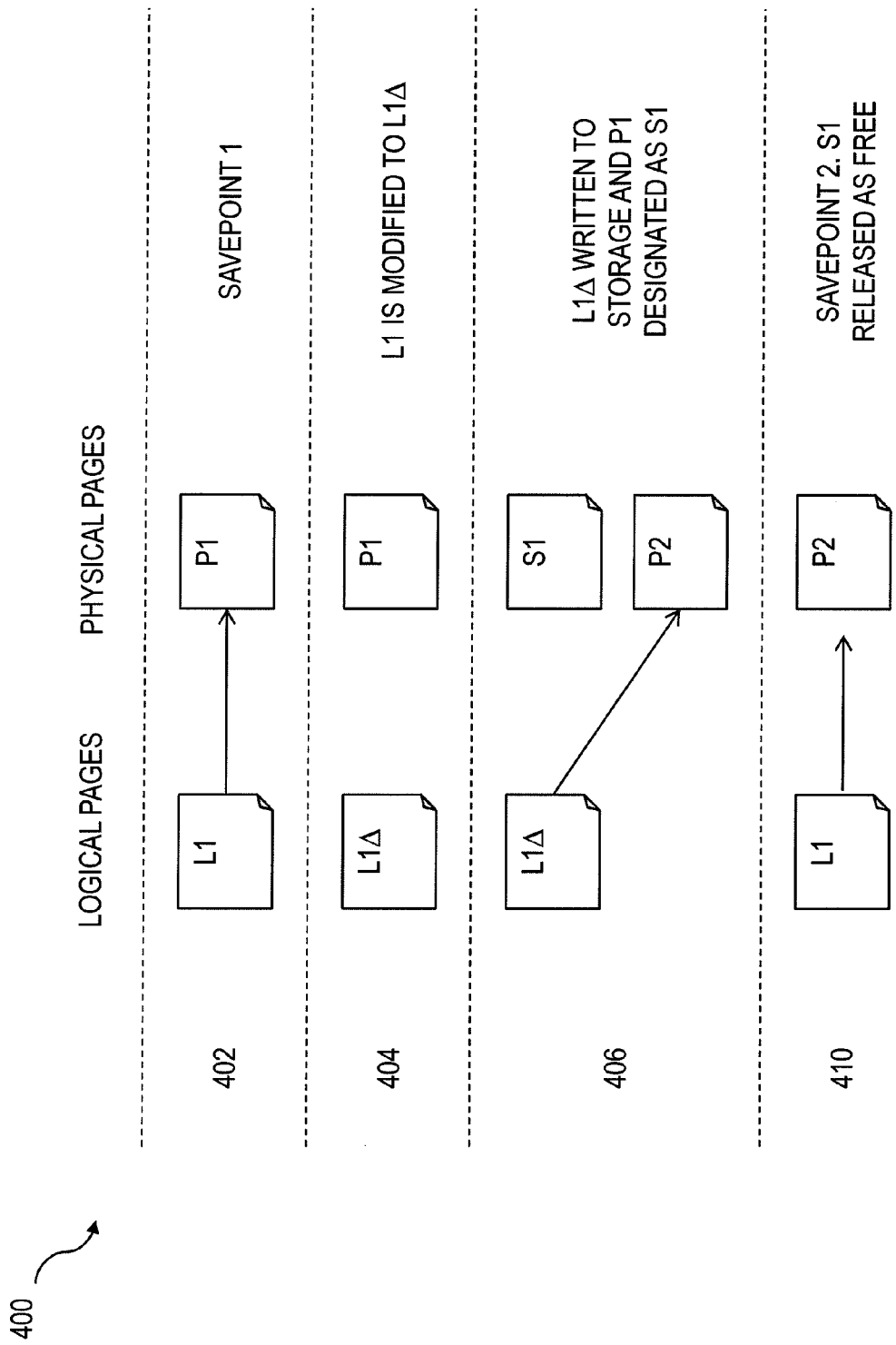
FIG. 4 is a logic flow diagram illustrating features consistent with one or more implementations of the current subject matter.

In an example of a shadow paging approach to retaining uncommitted changes, a shadow page that contains a savepoint version of a logical page is not overwritten until the next savepoint is successfully completed. This can be reflected in a page status table maintained by the system (e.g. in a free block manager as described below). As shown in the logical flow diagram 400 of FIG. 4, a logical page L1 is written to a first physical page P1 during a most recent savepoint at 402 and a mapping (L1, P1) is added to a converter table 342. After the savepoint, at 404 the logical page L1 is modified again to become L1Δ. When L1 needs to be written to the storage 114 again, for example because of cache replacement or because the next savepoint operation has begun, the first physical page P1 becomes a shadow page S1 and a new free first physical page P2 is assigned to the logical page L1. The first physical page P2 is marked as "used" and a new mapping (L1, P2) is written to the converter table 342 at 406. The old mapping is still available in an old version of the converter table that was stored with the most recent savepoint. The first physical page P1 is still needed to retain the shadow page S1, so its status is not set to "free." Instead, the first physical page P1 can be designated with a status of "free after savepoint." When the next savepoint is completed at 410, the status of the first physical page P1 can then be updated to "free."

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer program product storing instructions that, when executed by at least one programmable processor, cause the at least one programmable processor to perform operations comprising:
    caching a memory block comprising a physical storage page holding data of a data storage application in a page buffer, the caching occurring upon the memory block being designated for a change in status from a used status to a shadow status;
    processing, upon occurrence of a trigger event in a first batch process in which a status for a set of memory blocks is being changed, all pages stored in the page buffer, the first batch process comprising converting each of the pages in the page buffer from the used status to the shadow status and emptying the page buffer;
    receiving, without the trigger event occurring, a call to free the pages in the page buffer from the shadow status to a free status; and
    converting the pages in the page buffer from the used status directly to the free status in a second batch process upon receiving the call.

2. A computer program product as in claim 1, wherein the data storage application comprises at least one of a database application and a network-attached storage system.

3. A computer program product as in claim 1, wherein the trigger event comprises a preset time having elapsed.

4. A computer program product as in claim 1, wherein the page buffer has a fixed size and the trigger event comprises a number of memory blocks cached in the page buffer reaching the fixed size.

5. A computer program product as in claim 1, wherein the page buffer is retained in a persistence layer of the data storage application and the memory blocks are stored on a durable storage device.

6. A computer program product as in claim 5, wherein a free block manager in the persistence layer tracks status of the memory blocks.

7. A system comprising:
    at least one programmable processor; and
    a machine-readable medium storing instructions that, when executed by the at least one programmable processor, cause the at least one programmable processor to perform operations comprising:
    caching a memory block comprising a physical storage page holding data of a data storage application in a page buffer, the caching occurring upon the memory block being designated for a change in status from a used status to a shadow status;
    processing, upon occurrence of a trigger event in a first batch process in which a status for a set of memory blocks is being changed, all pages stored in the page buffer, the first batch process comprising converting each of the pages in the page buffer from the used status to the shadow status and emptying the page buffer;
    receiving, without the trigger event occurring, a call to free the pages in the page buffer from the shadow status to a free status; and
    converting the pages in the page buffer from the used status directly to the free status in a second batch process upon receiving the call.

8. A system as in claim 7, wherein the data storage application comprises at least one of a database application and a network-attached storage system.

9. A system as in claim 7, wherein the trigger event comprises a preset time having elapsed.

10. A system as in claim 7, wherein the page buffer has a fixed size and the trigger event comprises a number of memory blocks cached in the page buffer reaching the fixed size.

11. A system as in claim 7, wherein the page buffer is retained in a persistence layer of the data storage application and the memory blocks are stored on a durable storage device.

12. A system as in claim 11, wherein a free block manager in the persistence layer tracks status of the memory blocks.

13. A computer-implemented method comprising:
    caching a memory block comprising a physical storage page holding data of a data storage application in a page buffer, the caching occurring upon the memory block being designated for a change in status from a used status to a shadow status;
    processing, upon occurrence of a trigger event in a first batch process in which a status for a set of memory blocks is being changed, all pages stored in the page buffer, the first batch process comprising converting each of the pages in the page buffer from the used status to the shadow status and emptying the page buffer;
    receiving, without the trigger event occurring, a call to free the pages in the page buffer from the shadow status to a free status; and
    converting the pages in the page buffer from the used status directly to the free status in a second batch process upon receiving the call;
    wherein the page buffer is retained in a persistence layer of the data storage application and the memory blocks are stored on a durable storage device and a free block manager in the persistence layer tracks status of the memory blocks.

14. A computer-implemented method as in claim 13, wherein the data storage application comprises at least one of a database application and a network-attached storage system.

15. A computer-implemented method as in claim 13, wherein the trigger event comprises a preset time having elapsed.

16. A computer-implemented method as in claim 13, wherein the page buffer has a fixed size and the trigger event comprises a number of memory blocks cached in the page buffer reaching the fixed size.

17. A computer-implemented method as in claim 13, wherein at least one of the caching, the processing, the receiving, and the converting is performed by at least one programmable processor.

\* \* \* \* \*